US010969869B2

(12) United States Patent
Chassot

(10) Patent No.: US 10,969,869 B2
(45) Date of Patent: Apr. 6, 2021

(54) THERMAL MITIGATION OF A HAPTIC ELEMENT IN A PERIPHERAL DEVICE

(71) Applicant: Logitech Europe S.A., Lausanne (CH)

(72) Inventor: Jacques Chassot, Granges-de-Vesin (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/553,038

(22) Filed: Aug. 27, 2019

(65) Prior Publication Data

US 2021/0064136 A1 Mar. 4, 2021

(51) Int. Cl.
| | |
|---|---|
| *G06F 3/01* | (2006.01) |
| *A63F 13/285* | (2014.01) |
| *G08B 6/00* | (2006.01) |
| *H02P 6/15* | (2016.01) |
| *H02P 27/08* | (2006.01) |

(52) U.S. Cl.
CPC ............. *G06F 3/016* (2013.01); *A63F 13/285* (2014.09); *G08B 6/00* (2013.01); *H02P 6/157* (2016.02); *H02P 27/085* (2013.01); *G06F 2203/013* (2013.01); *G06F 2203/015* (2013.01)

(58) Field of Classification Search
CPC ........................ G06F 3/016; G06F 2203/013
See application file for complete search history.

(56) References Cited

U.S. PATENT DOCUMENTS

| | | | | |
|---|---|---|---|---|
| 10,326,330 | B2* | 6/2019 | Kursula | G06F 1/206 |
| 10,359,855 | B1* | 7/2019 | Vonikakis | G06F 3/011 |
| 2010/0188327 | A1* | 7/2010 | Frid | G06F 3/0483 |
| | | | | 345/156 |
| 2015/0205357 | A1* | 7/2015 | Virtanen | G06F 3/016 |
| | | | | 340/407.2 |
| 2017/0169674 | A1* | 6/2017 | Macours | G06F 3/016 |
| 2018/0051711 | A1* | 2/2018 | Kursula | H02K 7/061 |
| 2018/0365082 | A1* | 12/2018 | Richardson | G06F 9/541 |
| 2019/0018567 | A1* | 1/2019 | Murphy | G06F 3/011 |

* cited by examiner

*Primary Examiner* — David E Choi
(74) *Attorney, Agent, or Firm* — Kilpatrick Townsend & Stockton LLP

(57) ABSTRACT

A system comprising a host device configured to request a haptic effect from a peripheral device, the peripheral device configured to perform operations including: receiving a request from the host device to generate a haptic effect at a specified intensity; determining an operating range of a motor configured to generate the haptic effect on the peripheral device, where the operating range defines a maximum force that the motor can generate in a linear region of operation, and the operating range changes based on a temperature of the motor; scaling the specified intensity of the haptic effect based on the determined operating range of the motor; and controlling the operation of the motor to generate the haptic effect at the scaled specified intensity, where the scaling is performed by the peripheral device.

20 Claims, 8 Drawing Sheets

THERMAL MITIGATION OF A HAPTIC ELEMENT IN A PERIPHERAL DEVICE

BACKGROUND

Physical computer peripheral interface devices may include any auxiliary device that can be used to interface between a user (human) and a computing device, such as a computer. Some examples of peripheral devices that are typically physically manipulated by a human include keyboards, mice, joysticks, steering wheels, game controllers, presenters, remote controls, smart phones, smart wearables, and the like.

Users typically receive visual (e.g., monitors, displays) and aural feedback (e.g., speakers) in conventional computing systems. More contemporary systems may incorporate a haptic feedback for an enhanced user experience. Haptic feedback may simulate a physical response detectable by a user's sense of touch, which may include any suitable haptic effect not limited to force feedback (e.g., vibrations, pulses, etc.), vibro-tactile feedback, electro-tactile feedback, ultrasound tactile feedback, and thermal feedback to name some of the more common types. Systems incorporating haptic feedback continue to improve and further enhance the interface between human and machine. Despite these advances, more improvements are needed.

It should be noted that unless otherwise indicated herein, the materials described in this section are not prior art to the claims in this application and are not admitted to be prior art by inclusion in this section.

BRIEF SUMMARY

In certain embodiments, a system comprises a host device configured to request a haptic effect from a peripheral device, with the peripheral device including one or more processors configured to perform operations including: receiving a request from the host device, by one or more processors, to generate a haptic effect at a specified intensity; determining, by the one or more processors, an operating range of a motor configured to generate the haptic effect on the peripheral device, where the operating range defines a maximum force that the motor can generate in a linear region of operation, and the operating range changes based on a temperature of the motor; scaling, by the one or more processors, the specified intensity of the haptic effect based on the determined operating range of the motor; and controlling, by the one or more processors, the operation of the motor to generate the haptic effect at the scaled specified intensity, where the scaling can be performed by the peripheral device. In some aspects, determining the operating range of the motor can further comprise: identifying a condition wherein a maximum input voltage is applied to the motor that causes an input current to the motor to reach a maximum current value for the motor's present temperature; measuring the input current; and using the measured input current as a maximum current that the scaled current applied to the motor to generate the requested haptic effect falls within. The motor may operate in a closed-loop configuration to generate the haptic effect. The input current can be measured when the motor is detected to be stationary. In some aspects, the input current is measured after the input current has stabilized.

In some embodiments, a peripheral device comprises: a housing; one or more processors; and a motor coupled to the housing and controlled by the one or more processors, the motor configured to generate a haptic effect based on an amount of electrical current driving the motor, wherein the one or more processors are configured to: receive a request to cause the motor to generate the haptic effect having a force; determine an operating range of the motor, where the operating range is defined by a maximum force that the motor can generate, and the maximum force that the motor can generate changes based on a temperature of the motor; scale a current applied to the motor to generate the requested haptic effect based on the determined operating range of the motor; and apply the scaled current to operate the motor to generate the haptic effect. In some implementations, determining the operating range of the motor further comprises: identifying a condition wherein a maximum input voltage is applied to the motor that causes an input current to the motor to reach a maximum current value for the motor's present temperature; measuring the input current; and using the measured input current as a maximum current that the scaled current applied to the motor to generate the requested haptic effect falls within. In some cases, the input voltage can be a pulse-width-modulated (PWM) input signal having a duty cycle. The peripheral device can be any suitable device such as a computer mouse, a steering wheel, a gaming chair, gaming pedals, a presenter device, a game controller, a joystick, a smart wearable, a smart phone, a tablet computer, or haptic-enabled clothing, however certain preferred embodiments may include a gaming wheel configured to detect that a manipulable wheel of the gaming wheel is stationary for a threshold time and little back electro-motive-force (EMF) is present in the motor. The input current may be measured after the input current has stabilized. The motor may operate in a closed-loop system configuration to generate the haptic effect. The operating range of the motor further defines a maximum linear response curve for generating the haptic effect in response to the request. In some aspects, the one or more processors are disposed in the housing of the peripheral device. In certain embodiments, the request is received from an external computing device communicatively coupled to the peripheral device, and the scaling is performed independently of the external computer device.

In further embodiments, a method of operating a peripheral device can include: receiving a request, by one or more processors, to generate a haptic effect at a specified intensity; determining, by the one or more processors, an operating range of a motor configured to generate the haptic effect on the peripheral device, wherein the operating range defines a maximum force that the motor can generate in a linear region of operation, and wherein the operating range changes based on a temperature of the motor; scaling, by the one or more processors, the specified intensity of the haptic effect based on the determined operating range of the motor; and controlling, by the one or more processors, the operation of the motor to generate the haptic effect at the scaled specified intensity. Determining the operating range of the motor can further comprise: applying an input voltage to the motor that causes an input current to the motor to reach a predetermined maximum current value; and measuring the input current, wherein scaling the specified intensity of the requested haptic effect includes reducing the specified force based on the measured input current. The input voltage can be a pulse-width-modulated (PWM) input signal having a duty cycle. The input current is measured when no back electro-motive-force (EMF) is present on the motor. The input current, in some instances, may be measured after the input current has stabilized.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

DETAILED DESCRIPTION

Aspects of the present disclosure relate generally to computer peripheral devices, and more particularly to improvements in haptic feedback systems, according to certain embodiments.

In the following description, various examples of controlling one or more motors that provide a haptic effect are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 5:
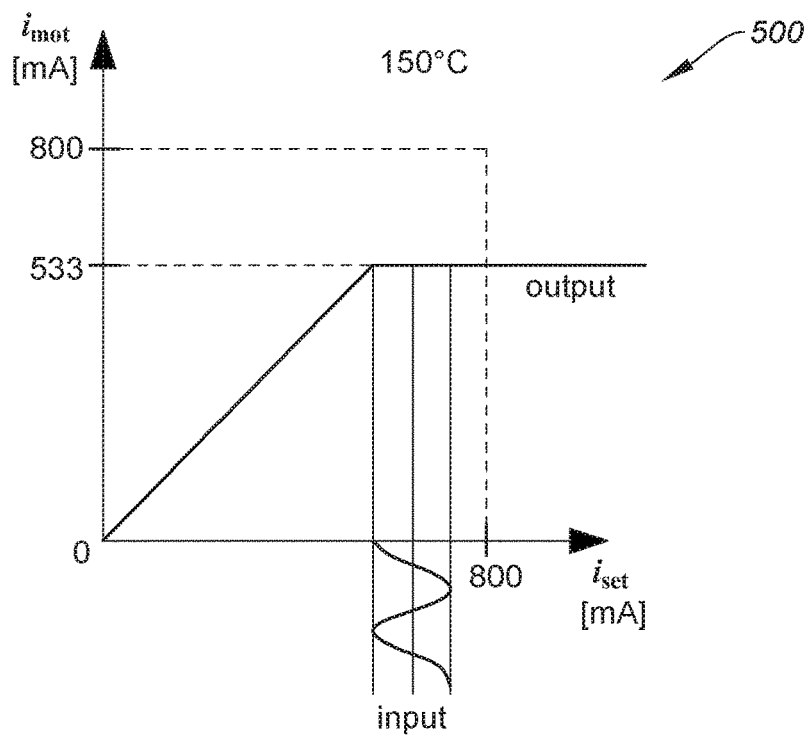
FIG. 5 is a graph showing a current response for a motor operating under high temperature conditions and configured for implementing a haptic effect in a peripheral input device.

The following high level summary is intended to provide a basic understanding of some of the novel innovations depicted in the figures and presented in the corresponding descriptions provided below. Aspects of the invention relate to the implementation and modification of haptic effects in peripheral input devices to compensate for temperature related performance degradation in certain embodiments. In some implementations, motors can be used to generate a haptic effect, such as force feedback. Force feedback can be comprised of a relatively low frequency force component (e.g., kinesthetic component) and a relatively high frequency force component (e.g., vibro-tactile). Certain peripheral devices (e.g., gaming steering wheels) may demand relatively high output haptic effects (e.g., haptic feedback) over extended periods of time, which can cause the motor to heat up and experience performance degradations. In these instances, a system comprised of the motor and a closed-loop controller configured to control the operation of the motor may provide a non-linear output response to an input driving the system, which may also be referred to as "clipping," especially when attempting to generate high output haptic effects. In some instances, clipping may result in a constant output in response to a range of set point currents that drive the closed-loop controller, as shown in FIG. 5 and further described below. In other words, the motor may become saturated wherein the maximum response that the motor may provide is reduced due to temperature effects and any requested motor output above this saturation point will result in the same output response from the motor.

In some implementations, the input to the closed-loop controller (e.g., the input being referred to as the "current set point") may be scaled to mitigate performance degradations, as shown and described below with respect to FIG. 6. For instance, an upper limit (e.g., maximum current) for the motor output may be set based on the point of saturation, such that a full range of haptic output (e.g., linear output) is available over a reduced range. The point of saturation may be detected periodically or continuously and the corresponding adjustments described above (and throughout this disclosure) can be applied accordingly. In other words, the linear operating output range of the motor may be compressed such that any requested output response (e.g., haptic effects) can be realized, but over a lower overall range of operation, which can improve the user experience.

Some embodiments may include a peripheral device (e.g., a gaming steering wheel) having a housing, one or more processors (e.g., internal and/or external to the peripheral device), and a motor (e.g., direct current (DC) brushed motor, brushless motors, etc.) coupled to the housing and controlled by the one or more processors, the motor configured to generate a haptic effect (e.g., force feedback) based on an amount of electrical current driving the motor. The one or more processors can be configured to receive a request (e.g., game application on a host computer requesting a force feedback corresponding to an in-game event) to cause the motor to generate the haptic effect having a specified force (e.g., feedback intensity); determine an operating range of the motor, wherein the operating range defines a maximum force that the motor can generate, and wherein the operating range changes based on a temperature of the motor; scale the specified force of the requested haptic effect based on the determined operating range of the motor; and control the operation of the motor to generate the haptic effect at the scaled specified force. In some aspects, determining the operating range of the motor can include applying an input voltage (e.g., a pulse-width modulated input) to the motor that is intended to cause an input current to the motor to reach a predetermined maximum current value; and measuring the input current, where scaling the specified force of the requested haptic effect includes reducing the specified force based on a ratio between the measured input current and the predetermined maximum current value. In some cases, the operating range of the motor is detected in real-time when the input device (e.g., steering wheel) is being used, and typically when the motor is relatively stationary (e.g., where a user is not rotating the wheel and causing back electromotive force (EMF)), to characterize the output ceiling of the motor at its current/recent operating temperature (e.g., the point of saturation). In some cases, one way to mitigate the problem of overheating and saturation conditions of a motor configured for haptic output is to use a more robust motor, however such motors may be costly, particularly when multiple motors are used, which can be problematic when trying to maintain certain price points. Thus, the methods and systems described herein allow relatively cheaper and less robust motors to be used without the user noticing any appreciable or discernable performance degradation.

Alternatively or additionally, other methods of determining an operational state of a motor configured to generate haptic effects may be employed. For instance, a thermocouple may be configured to directly (e.g., coupled to the motor) or indirectly (e.g., couple to a housing adjacent to a motor) determine an operating temperature of the motor for thermal mitigation, as described throughout the present disclosure. The embodiments described herein typically incorporate closed-loop systems (e.g., feedback-based solutions) for mitigating deleterious thermal effects. One of ordinary skill in the art with the benefit of this disclosure would appreciate the many modifications, variations, and alternative embodiments thereof.

It should be noted that while certain embodiments are described herein, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

Figure 1:
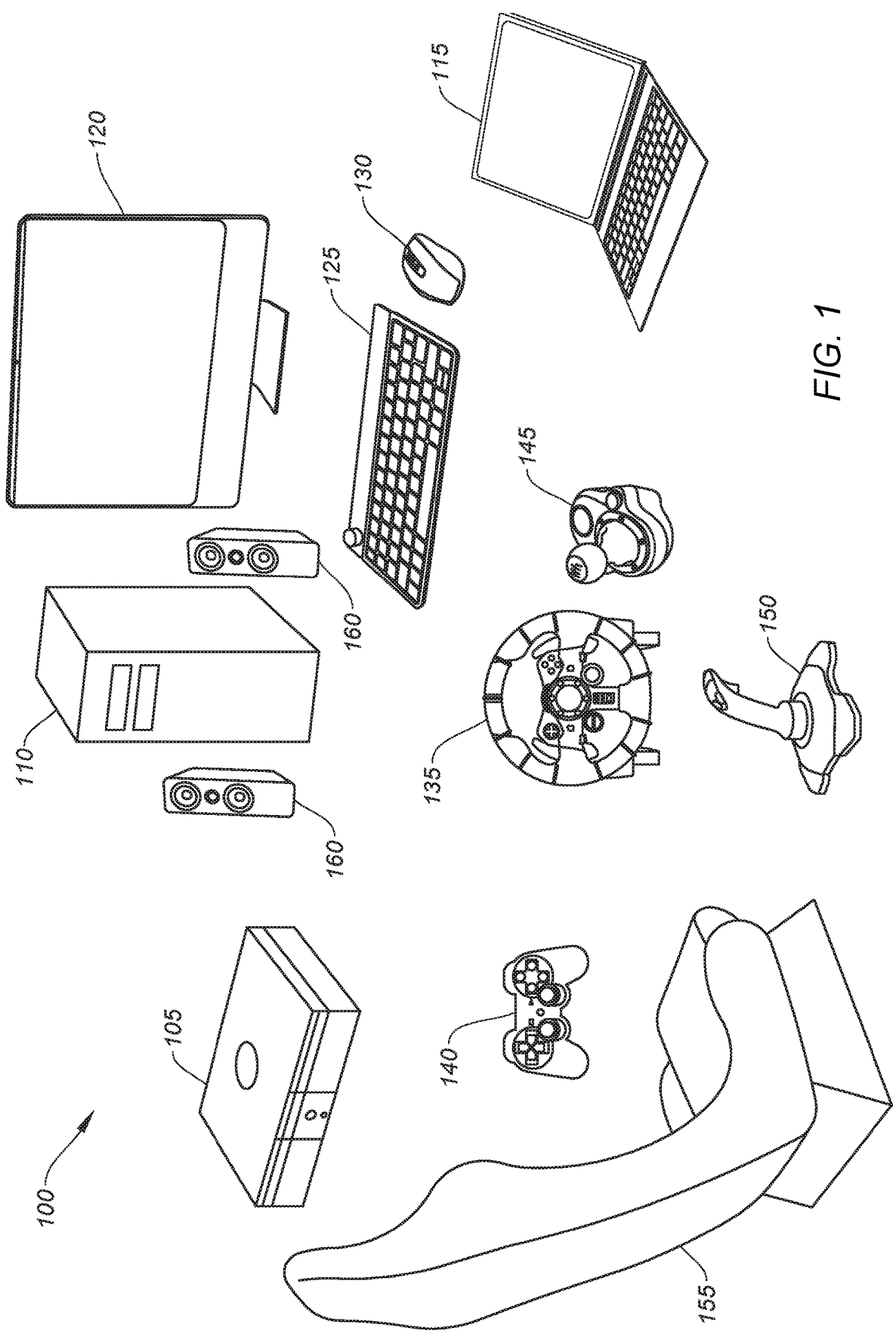
FIG. 1 shows an example of a system that can include any of a variety of host computing devices and peripheral devices that may incorporate haptic effects, according to certain embodiments.

FIG. 1 shows an example of a system 100 that can include any of a variety of host computing devices and peripheral devices that may incorporate haptic effects, according to certain embodiments. A typical host computing device as described herein can include any of a gaming system 105, a desktop computer 110, a laptop computer 115, or any other suitable host computing device (e.g., entertainment system, set top box, smart phone, smart wearable, or the like). A typical peripheral device can include any of a keyboard 125, computer mouse 130, gaming steering wheel (also referred to as a "steering wheel," "gaming wheel," or the like) 135, game controller 140, shifter 145, joystick 150, gaming chair 155, or other suitable peripheral device (e.g., presenter device, remote control, headphones, haptic-enabled wearables such as gloves, clothing, etc., virtual and/or augmented reality controllers such as stylus devices and/or 3/6 degree-of-freedom controllers, pedals, or the like). The haptic effects described herein may be incorporated in any suitable peripheral device, but will typically be configured in user controlled peripheral devices (e.g., 135, 140, 150) rather than peripheral devices not configured for user inputs (e.g., gaming chair 155, speakers 160, head-mounted displays, etc.), although such peripheral devices can be configured for haptic feedback. In a gaming wheel, for instance, one or more motors configured to generate a haptic effect may be incorporated within the steering wheel itself, within the base of the input device, or a combination thereof. In a gaming controller or joystick, one or more motors configured to generate a haptic effect may be incorporated in or adjacent to control elements of the input device, in a base portion, or a combination thereof. One of ordinary skill in the art with the benefit of this disclosure would appreciate the many modifications, variations, and alternative embodiments thereof for incorporating one or more motors in a peripheral device to generate a haptic effect as described herein.

A host computing device may be referred to herein as a "host computer," "host device," or the like, and may include a machine readable medium (not shown) configured to store computer code, such as driver software, firmware, and the like, where the computer code may be executable by one or more processors of the host computing device to control the one or more peripheral input devices.

A peripheral input device may be referred to as an "input device," "peripheral device," or the like. It should be understood that although the majority of embodiments depicted herein are focused on applications involving gaming wheels (e.g., wheel 135), those of ordinary skill in the art would understand how to adapt the concepts applied to one or more motors configured to generate a haptic effect in any suitable peripheral device.

In the descriptions for some embodiments, system 100 is generally referred to as a desktop or laptop computing device. However, it should be understood that system 100 can be any suitable computing device further including a tablet computer, a smart phone, a virtual or augmented reality interface (e.g., having 2D or 3D displays), a holographic interface, a controller for an instrument, or the like. One of ordinary skill in the art would understand the many variations, modifications, and alternative embodiments thereof.

Figure 2:
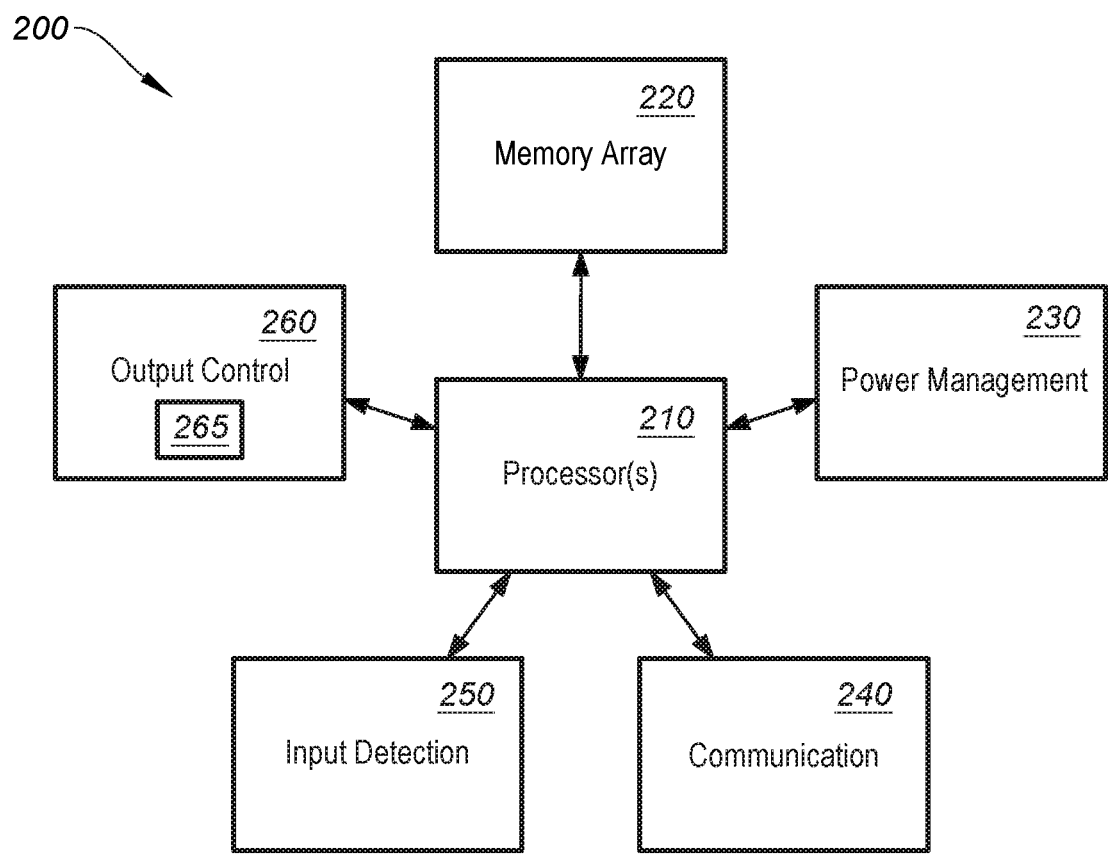
FIG. 2 is a simplified block diagram of an example of a system for operating a peripheral input device, according to certain embodiments.

FIG. 2 shows a system 200 for operating a peripheral input device (e.g., gaming wheel 135), according to certain embodiments. System 200 may include processor(s) 210, memory 220, a power management system 230, a communication system 240, an input detection module 250, and an output control module 260. Each of the system blocks 220-260 can be in electrical communication with the processor(s) 210 (e.g., via a bus system). System 200 may also include additional functional blocks that are not shown or discussed to prevent obfuscation of the novel features described herein. System blocks 220-260 may be implemented as separate modules, or alternatively, more than one system block may be implemented in a single module. In the context described herein, system 200 can be incorporated in a gaming wheel 135, as shown and described above with respect to FIG. 1.

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 135 (e.g., system block 220-260). Alternatively or additionally, some of system blocks 220-260 may include an additional dedicated processor, which may work in conjunction with processor(s) 210. Processor(s) 210 may be local to the peripheral device (e.g., contained therein), may be external to the peripheral device (e.g., off-board processing, such as by a corresponding host computing device), or a combination thereof). One of ordinary skill in the art would understand the many variations, modifications, and alternative embodiments that are possible.

Memory 220 may be configured to store information pertaining to one or more operational configurations of input device 135. As further discussed below, one or more operational configurations of input device 135 may include setting performance characteristics of gaming wheel 135, including but not limited to, one or more ranges of haptic effects as further described below with respect to FIGS. 3-5, a range of inputs (e.g., left/right steering, 6 DOF steering with a joystick, etc.), or the like.

Additionally, memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, haptic motor power control (e.g., output scaling, as further described below at least with respect to FIGS. 3-5), and the like, for input device 135. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 240 can be configured to provide wireless communication with a corresponding host computing device (e.g., 105, 110, 115), or other devices and/or peripherals, according to certain embodiments. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hardwired connection to the corresponding host computing device. For example, input device 135 can be configured to receive a Universal Serial Bus (USB) cable to enable bi-directional electronic communication with the corresponding host computing device or other external devices. Some embodiments may utilize different types of cables or connection protocol standards to establish hardwired communication with other entities.

Input detection module 250 can control the detection of a user-interaction with input elements on input device 135. For instance, input detection module 250 can detect user inputs caused by rotation of the steering wheel, button presses on one or more buttons, D-pad and/or joystick movements, or other suitable input elements or devices such as a media control buttons, touch sensors (e.g., touch pads), and the like. In some embodiments, input detection module 250 can work in conjunction with memory 220 to detect inputs on input device 135 and associate various functions with each input element (e.g., steering wheel rotation).

In some embodiments, output control module 260 can control various outputs for a corresponding peripheral input device. For instance, in gaming wheel 135, output control module 260 may control one or more motors (265) and a corresponding haptic effect such as a vibration of the steering wheel, a display, one or more LEDs, an audio output, or the like. In some cases, output control module 260 may work in conjunction with memory array 220 and/or processor(s) 210 to control an operating range (also referred to herein as an "operational range") of one or more motors configured to generate a haptic effect, as further described below at least with respect to FIGS. 3-8. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

As described above, gaming steering wheels may incorporate one or more motors configured to generate a haptic effect, such as force feedback. In some implementations, the force feedback may be made up of multiple components including a simulation of motions of a vehicle by using relatively low-frequency, high-amplitude forces, and a simulation of car engine noise or track surface noise using relatively high-frequency low-amplitude. In consumer electronic applications, product constraints may dictate the use of small, low-cost DC brushed motors, which can have a low torque constant (e.g., a torque for a given current). These motors can utilize higher current to generate stronger forces. The higher current may result in the DC motor producing more heat than the lower current due to the electrical resistance in the windings of the motor. The heat can affect the electrical resistance of the motor windings as increased temperature can result in increased resistance of the motor. As a result, a maximum current that a motor can accept to produce a corresponding torque force can decrease as its temperature increases. The torque of the motor can be proportional to the current, therefore a maximum torque of the motor can decrease as temperature rises (again, due to the increased resistance of the motor windings). Thus, the operating range of the motor may be substantially reduced (e.g., up to 40% or more) in high temperature operating conditions. This phenomenon can be exasperated when attempting to optimize the cost for performance of a DC motor. As an example, a more robust motor which is less susceptible to thermal degradation may be costlier as it may contain more mass to act as a heat sink to distribute heat away from the motor windings or may have thicker motor winding wire. FIGS. 4 and 5 show how this thermal degradation phenomenon may manifest during operation. Furthermore, despite the frequent discussion of DC brushed motors, it should be noted that brushless motors may be used in the embodiments described herein.

Figure 3:
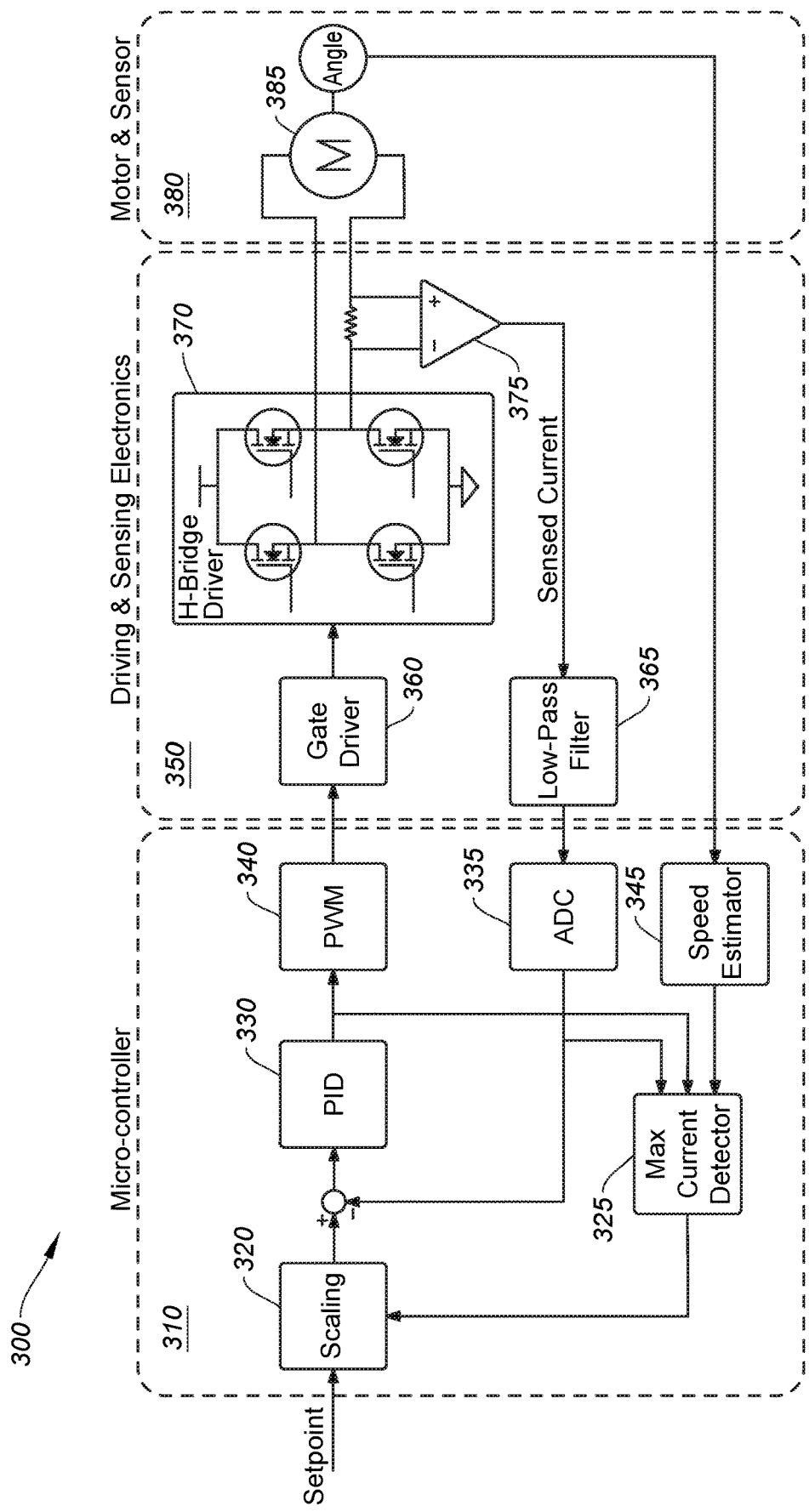
FIG. 3 shows a block diagram of a system configured to scale a number of set points for a peripheral device based on a current flowing through a motor at a given temperature, according to certain embodiments.

FIG. 3 shows a block diagram of a system 300 configured to modify an operational set point for a motor in a peripheral device, according to certain embodiments. System 300 may work in conjunction with or be integrated with system 200. System 300 can include a micro-controller 310, driving and sensing electronics 350, and a motor/sensor block 380. The micro-controller may include a scaling block 320, a proportional-integral-derivative (PID) controller 330, a pulse width modulator (PWM) 340, an analog-to-digital converter (ADC) 335, a speed estimator block 345, and a maximum current detector 325, as shown in FIG. 3. PID 330 is typically a closed-loop controller and may be configured to receive an input corresponding to a magnitude of error, which can be a difference between a scaled set point current and the sensed current. The PID 330 output can be a voltage (e.g., PWM duty cycle) that may be applied to the motor in order to help minimize this error. The voltage may be constantly changing as PID 330 continues to correct small errors. In some cases, PID 330 may perform such calculations as many as 4000 times per second, although other rates are possible, as would be appreciated by one of ordinary skill in the art with the benefit of this disclosure. Driving and sensing electronics (DSE) 350 can include a gate driver 360 and bridge driver 370, which may operate to convert low power signals into higher voltage and current signals. The output of bridge driver 370 may be sensed by a current sense amplifier 375 and sent through a filter (e.g., low pass filter 365) to feed ADC 335, as described above. Bridge driver 370 may further drive motor 385 of motor and sensor block 380. In a peripheral device such as a steering wheel, the angle may be used to estimate (e.g., locally or off-board) the speed of a rotation of the wheel, which can be used to be both reported to a corresponding software application (e.g., to control a video game) and can be used to measure when the speed of the wheel is close to zero to determine the maximum current that the motor can output (e.g., by speed estimator 345), as described in further detail below. Maximum current detector 325 may be configured to estimate a saturation current of the system comprising the controller (310) and motor, which is typically performed when certain conditions are met. For instance, some embodiments may estimate a saturation current of the motor when (1) the PWM duty cycle provided by PID 330 is set to the maximum allowed level (e.g., 100% duty cycle; or other power supply type), which may indicate that the motor current cannot reach the set point current at the given temperature; (2) the current is stable; and (3) the speed should be close to zero to avoid the effect of back-EMF. In some cases, if the duty-cycle remains at a maximum value for some time (condition 1), the current is not increasing (condition 2), and there is little or no back-EMF (condition 3), this can mean that the set point current is higher than the motor saturation current. Thus, system 300 can provide an updated max current value that is used to scale down the current set point. This can result in a scaled operating range that allows for a linear motor output even with changes in motor performance due to temperature, as shown and described, for example, in FIG. 6 below. Thus, system 300 discloses a closed-loop operation that scales an input set point current (which defines the desired haptic output of the motor) to accommodate an operational range of the motor, even when the motor is experiencing a reduced output capability due to deleterious temperature effects, as further shown and described in the waveforms and flowcharts that follow.

Referring back to back-EMF voltages—generally DC motors can also operate as generators. If a moving part of the motor is rotated via external means, a voltage will be generated and accessible at its terminals. This phenomenon also occurs during normal operation of the motor. If a voltage is applied to a DC motor, it rotates and begins generating a back-EMF voltage that is subtracted from the power supply voltage. When a forced rotation is applied in the opposite direction, the back-EMF voltage is added to the power supply voltage. The change in the total voltage applied to the motor affects the current and corresponding output torque of the motor. In closed loop systems, such as systems 200 and/or 300 as described above, the current may be monitored and the voltage applied to the motor (e.g., via PWM) may be adjusted to keep the current at a desired level (e.g., the current speed of the motor). This can occur at any suitable frequency, which can range from 4000 times per second or faster to slower frequencies (e.g., every 10 ms, 1 ms, or the like).

Figure 4:
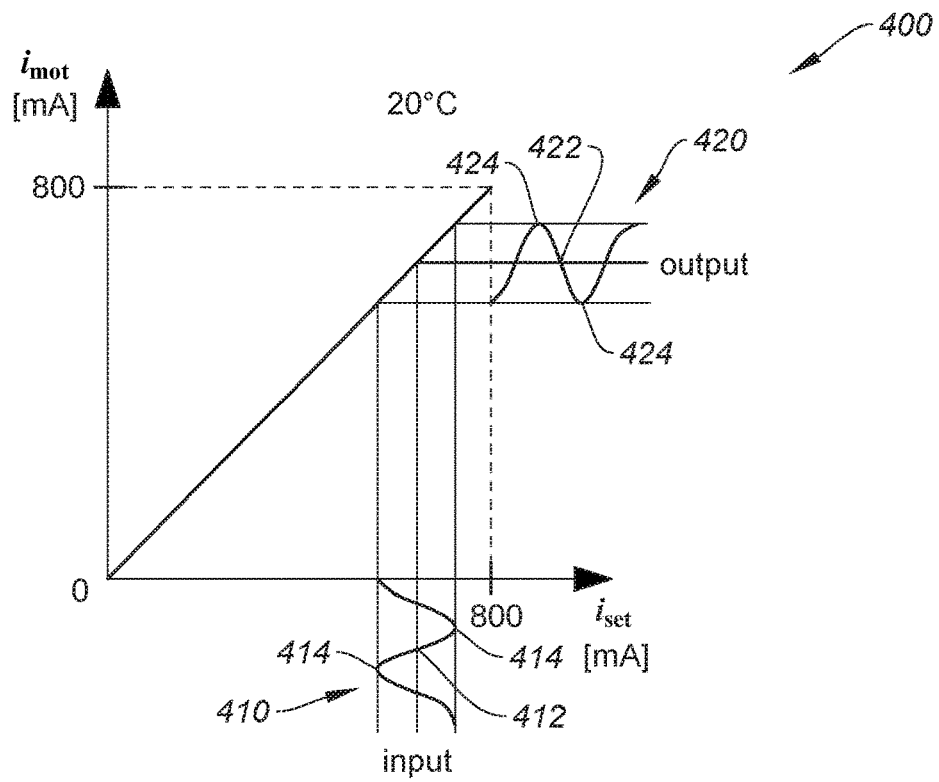
FIG. 4 is a graph showing a current response for a motor operating under nominal temperature conditions and configured for implementing a haptic effect in a peripheral input device, according to certain embodiments.

FIG. 4 is a graph 400 showing a current response for a motor operating under nominal temperature conditions (e.g., 20° Celsius) and configured for implementing a haptic effect in a peripheral input device, according to certain embodiments. In some embodiments, the current response includes an input/output response of the motor current ($i_{mot}$) in response to a set point current defining a desired current (e.g., as per a software application) applied to the closed-loop controller ($i_{set}$) for a typical brushed DC motor used in gaming wheels. The maximum current may correspond to the intensity of the maximum haptic effect (force feedback) that the motor is configured to generate. The winding resistance in the example shown (the resistance of the inductive coils in the motor) may be 30 ohms at 20° C. (FIG. 4) and 45 ohms at 150° C. (FIG. 5), and the power supply voltage is 24 V DC. The motor current 410 (input) is at 640 mA DC current (412) with a 160 mA pk-pk oscillation (414). Referring to FIG. 4, the system (input/output relationship) has a linear output response at 20° C., such that input current signal 410 (the set point current) results in an accurately produced output waveform (e.g., no thermal distortion) and corresponding haptic effect. This type of output response may be expected when the motor is operating at nominal temperatures (e.g., the motor is not running at relatively high temperatures).

Referring now to FIG. 5, graph 500 shows a current response for a motor operating under high temperature conditions (e.g., 150° C.) and configured for implementing a haptic effect in a peripheral input device, according to certain embodiments. For the purpose of explanation, FIG. 5 depicts the input/output relationship for the same motor as shown in graph 400. In the example shown, the system is able to accurately reproduce the desired waveform at 20° C., but exhibits output saturation (also referred to as "clipping") at high temperatures (150° C.) with the DC output set current reducing from 640 mA DC to 533 mA DC. As described above, this is due to the increased resistance of the motor windings caused by increased temperatures, resulting in a reduced maximum current that can drive the motor when the system (e.g., the combination of the controller and motor) is saturated. As shown in FIG. 5, the output is flat (a constant haptic effect) and at a lower intended intensity in response to a request for a time varying haptic effect at a higher intensity, as the lowest point for the input current (640 mA-80 mA) is 560 mA, which is higher than what the motor can output due to the deleterious temperature-based effects described above, which limits the motor's drive current to 533 mA. At 150° C., a similar magnitude input signal could be accurately produced (with no clipping) at approximately 453 mA DC ($i_{sat}$ 533 mA-160 mA pk-pk) or less, which can result in a 40% reduction or more in available output range with further increased motor temperatures. Note that the haptic effect may correspond to a relatively high frequency component of the current driving the motor; thus, a flat output response or a response with a highly attenuated AC component (as shown in FIG. 5) may result in little to no discernable haptic effect for the user (e.g., no haptic feedback—as the vibrations that correspond to the AC component may not be generated. Note that feedback can be comprised of a low frequency force component (kinesthetic) and a high-frequency haptic component (vibro-tactile). If the motor saturates, the haptic component may be clipped or may completely disappear. The force component may also be reduced but it does not disappear.

In practice, a user may experience undesirable haptic effects resulting from clipped output signals. For example, a software application running on a host computer may request a range of haptic output intensities that correspond to in-application events that may result in certain requested haptic outputs to be significantly reduced, or in some cases, no perceptible output, due to clipping as depicted in FIG. 5 wherein responses above a threshold current/torque force result in the same torque output. This can adversely affect the user experience.

Some embodiments may be configured to utilize a closed-loop motor control system where the current set point can be permanently or statically scaled down to a range that the system can reliably generate, even at high operating temperatures. One drawback may include a reduced force feedback, even for applications that only generate strong forces for short periods of time that do not produce significant temperature increases, as the scaling may not be dynamically modified to accommodate different output requirements.

Some preferred embodiments may be configured to dynamically scale the current set point according to an estimate of the motor winding resistance. Note that the maximum current, as described herein, generally refers to the maximum operating current that the motor can accept, and the linear operating range of the motor below the maximum operating current is scaled accordingly, such that any requested set point current within the operating range (e.g., received as a request from a gaming application) will be scaled down based on the newly determined maximum operating current. In instances where there is no temperature-based reduction in maximum operating current (e.g., motor temperature at 20° C.), then no scaling at any input may be necessary. In instances where the motor's maximum operating current is reduced due to the temperature-induced increase in motor winding resistance, then scaling of the input may be applied, as shown and described below with respect to FIG. 6. The set point can be set (e.g., scaled) periodically (e.g., once per second, etc.) or pseudo-continuously (e.g., essentially real-time from a user perspective at 4000 times per second) at any suitable rate. Such embodiments may prevent saturation when, for instance, software applications having high force feedback demands that cause the motor to reach high temperatures, and further allows for less demanding applications that keep the motor cool and can generate high current peaks when requested by the application.

In these cases, a maximum current may be measured using any suitable technique. As indicated above, the system (e.g., 200, 300) can continuously or periodically monitor the current flowing through the one or more motors in the peripheral device. The current through a motor can vary widely during normal use, so preferred embodiments may measure the current through the motor under one or more conditions that cause the motor to operate under a maximum current condition to determine a point of saturation and consequently a maximum linear output (e.g., maximum linear force feedback response). Some possible conditions can include: (1) a voltage set at a known constant (e.g., 24 V) by the closed-loop controller and preferably at a maximum value (e.g., setting a PWM at 100% duty-cycle; note that under normal operating conditions, the voltage may be constantly changing in a closed-loop system where a desired current is trying to be reached. Using a maximum value helps to mitigate this issue); (2) in the case of a steering wheel, the motor current may be measured when the wheel rotation speed is at or close to zero (e.g., preferably for a period of time (e.g., 100 ms) to allow the PWM to settle), which can ensure that the current measurement is not affected by, for example, back-EMF voltage that is added or subtracted to the motor supply voltage when the motor rotates; and (3) when the current is stable—due to the inductance of the windings of the motor, the current flowing through the windings needs some time to stabilize after the set point current is changed. This is further described below with respect to FIG. 8.

In some implementations, when the system measures a saturation current lower than the requested set point current value, it means that the resistance of the motor windings has increased and clipping may occur if the game requests strong force feedback. In that case, the measured saturation current becomes the new maximum current to be used to scale subsequent set point currents. Periods where saturation is not detected for an extended period of time (e.g., 1-10 s) may be indicative of the motor cooling down and the winding resistance decreasing. In some implementations, in response to the absence of a saturation condition for a threshold time period, the maximum current setting may be continuously or periodically increased at a particular fixed or variable rate (e.g., 20 mA/minute). In some embodiments, the maximum current may be set based on the estimated resistance of the winding for both decreasing (increasing temperatures) and increasing (decreasing temperatures) set point conditions. In other words, rather than increasing the scaled set point according to a predetermined rate, the system may increase the set point current based on the estimated resistance of the motor windings in a similar fashion as described above.

Figure 6:
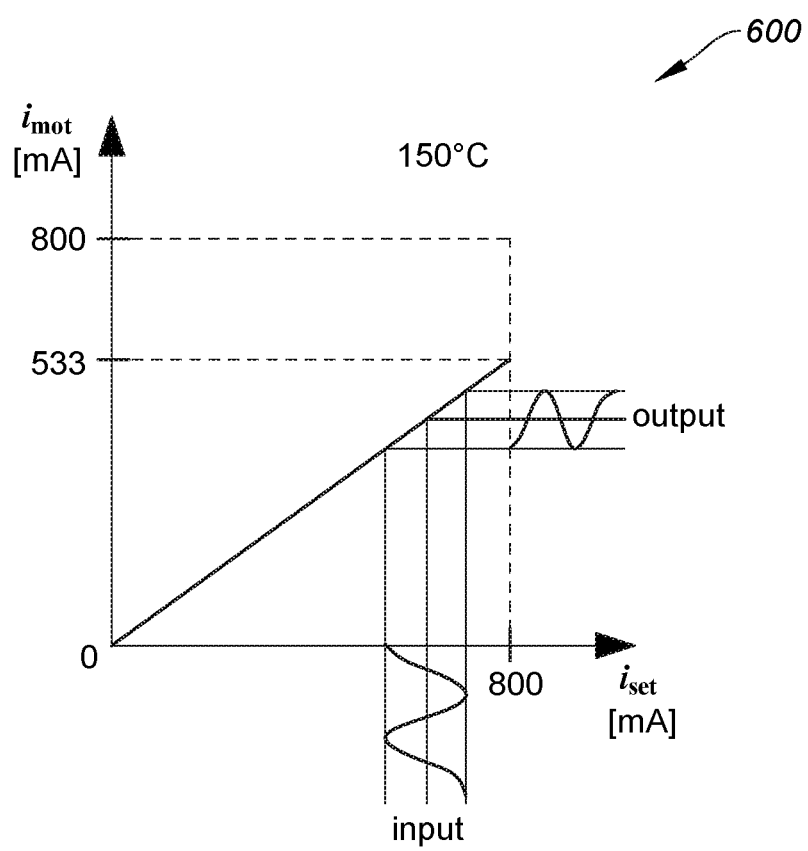
FIG. 6 is a graph showing a current response for a motor operating under high temperature conditions, according to certain embodiments.

FIG. 6 is a graph 600 showing a current response for a motor operating under high temperature conditions, according to certain embodiments. At nominal motor temperatures (e.g., 20° C.), as shown in FIG. 4, the motor would typically output a haptic effect at the requested output up to the maximum capability of the motor (e.g., 800 mA or other suitable electric motor operating current range). For instance, an input current of 640 mA+/−80 mA pk at nominal operating temperatures would cause the motor to generate a corresponding output (e.g., a haptic effect such as force feedback) at the same operating current, as 640 mA+80 mA is less than the 800 mA limit for the particular motor. Under high temperature conditions (e.g., 150° C.), the input signal (e.g., the requested haptic effect and corresponding magnitude) would be clipped as shown in FIG. 5. As described above, electric current set point values provided by an application can be scaled down according to the maximum motor current estimated by the peripheral device. When the application requests a maximum current (e.g., maximum force feedback setting), the peripheral device injects the maximum current (e.g., 533 mA) that the motor windings can accept at the motor's temperature, which may be less than the requested amount due to the system saturation condition described above. In FIG. 6, scaling is applied to the motor's requested set point current (e.g., based on the determined maximum operating current of the motor) and the high-frequency vibration is reduced, but still present. By way of example, if the DC value is scaled from 640 mA to 533 mA, then the AC value may be scaled from 80 mA to 80*533/640=66.625 mA; thus the scaled value is then approximately 533 mA+/−66.6 mA. Further, the motor output can retain a linear operational output, albeit scaled down based on the motor's detected or estimated present output ability. Thus, applying a maximum current estimation and scaling the set point of the motor accordingly provides at least the same benefits as open-loop systems where the output amplitude is reduced but no clipping occurs. However, unlike open-loop systems, the proposed implementations described herein preserve linearity and reactivity of the motor control system, as well as immunity to back-EMF conditions, which is a considerable benefit of closed-loop systems. It should be noted that the scaling described herein can be controlled wholly by the peripheral device itself (e.g., system 200) and completely independent from a corresponding host computing device (e.g., the host computing device may not have knowledge of the scaling of the motor output, as described above). In some aspects, the scaling may be performed as a joint-controlled effort by both the peripheral device (e.g., system 200) and one or more external processing resources (e.g., host computer). One of ordinary skill in the art with the benefit of this disclosure would appreciate the many modifications, variations, and alternative embodiments thereof.

Alternatively or additionally, a similar control scheme may be applied by obtaining the temperature of the motor windings themselves. A thermocouple or similar temperature sensor could be used for that purpose. However, such implementations may be difficult (and/or costly) as mechanically coupling a thermocouple can be very difficult to implement in DC brushed motors because the windings are rotating.

In further embodiments, the resistance of the motor windings can be estimated at any motor voltage and/or speed, rather than at the maximum current. In PWM systems where the current flowing through the motor is constantly increasing and decreasing in response to the power supply being switched on and off (e.g., via PWM at 24000 times per second), several parameters should be known precisely in order to solve the electrical equation of the RL circuit (e.g., the resistance and inductance of the motor windings, winding inductance and current variation (di/dt) to make the measurement when the current is not stable; back-EMF being constant and the speed should be known when making a measurement when the speed is not zero), as would be appreciated by one of ordinary skill in the art with the benefit of this disclosure. Some of these parameters vary from one motor to another due to tolerances (e.g., winding inductance, brush resistance, and back-EMF constant). Some parameters may be difficult to measure with the preferred accuracy (e.g., di/dt and rotating speed of the wheel). Thus, scaling the motor output can be done with estimates generated under normal motor operating conditions (e.g., not at zero speed), however due to the variations and tolerances described above, these types of embodiments may be more costly to implement and more likely to result in less accurate adjustments.

In some alternative embodiments, the peripheral device may have user selectable operational settings where the user can select a range of operation, which may adjust the current set point and compress the response curve accordingly. For instance, as the peripheral device heats up, haptic effects may become noticeably attenuated or in severe cases non-existent (e.g., due to an output current that loses its AC component (as shown in FIG. 5). In such cases, the user may select a new lower set point that may reduce the overall range of the haptic effect, but will allow the motor to still generate a proportional dynamic haptic effect over the full input range of the peripheral device. The user can then set the range back manually, or the system may automatically set it back using any of the methods of auto adjustment, as described above.

Figure 7:
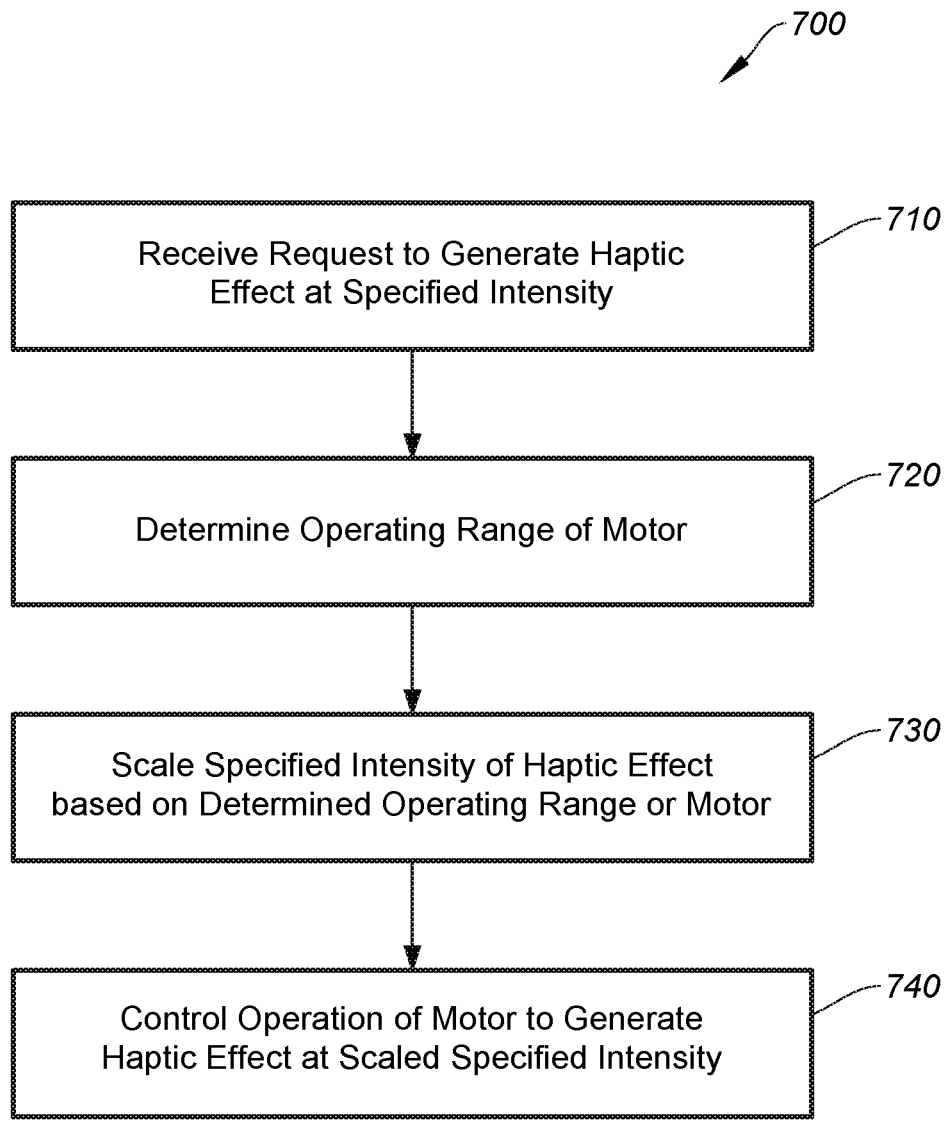
FIG. 7 is a simplified flow chart for a method of controlling the operation of one or more motors configured for implementing a haptic effect in a peripheral device, according to certain embodiments.

FIG. 7 is a simplified flow chart for a method 700 of modifying an operational set point of one or more motors of a peripheral device, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by aspects of system 200 (e.g., processor 210), system 300, system 900 (e.g., processor(s) 902), or a combination thereof.

At operation 710, method 700 can include receiving a request, by one or more processors, to generate a haptic effect (e.g., vibration, force feedback effect, etc.) at a specified intensity, according to certain embodiments. In some aspects, the request may come from any suitable host device, such as desktop computer, laptop computers, game systems, or the like, as described above with respect to FIG. 1. The one or more processors may be limited to the peripheral device such that the peripheral device can modify the operational set point of the motor(s) in a manner that is wholly independent from the host computing device and, in some cases, not communicated to the host computing device. Alternatively or additionally, the host computing device may be aware of the modification and/or may share computational resources to determine set point adjustment, as described above. The peripheral device can be any suitable input device including a gaming wheel, joystick, gaming controller, gaming chair, head mounted display, smart wearables, or the like, as described above with respect to FIG. 1. One of ordinary skill in the art with the benefit of this disclosure would appreciate the many modifications, variations, and alternative embodiments thereof.

In some embodiments, the specified intensity may correspond to a magnitude of the haptic effect to be generated by the motor. For example, a high intensity may correspond to a high force feedback effect, and a low intensity may correspond to a low force feedback effect. In some cases, the specified intensity may include an input current for the one or motors; an operating voltage for the power supply driving the one or more motors (e.g., a supply voltage setting and/or a PWM duty cycle setting); a haptic effect value which may correspond to a value within a range (e.g., a value between 1-100, where the peripheral device may select the corresponding PWM duty cycle for the motor), or the like. One of ordinary skill in the art with the benefit of this disclosure would appreciate the many modifications, variations, and alternative embodiments thereof.

At operation 720, method 700 can include determining, by the one or more processors, an operating range of a motor configured to generate the haptic effect on the peripheral device, according to certain embodiments. For example, the operating range may be a minimum output (e.g., zero output) to a maximum output (e.g., maximum force feedback) for the motor. The output response for the motor may be linear (as shown in FIGS. 4 and 6), however some implementations may incorporate multiple linear responses—each having a different slope, or a non-linear output response. Some motors may incorporate hysteresis and/or a different output slope depending on whether the output is increasing or decreasing. Referring to FIG. 6, the operating range of the motor at 150° C. may be determined to be 0-533 mA. The examples provided herein determine the operating range based on current, however other metrics may be used, such as motor resistance, motor temperature, or the like, as would be appreciated by one of ordinary skill in the art with the benefit of this disclosure. In some aspects, the operating range may define a maximum force that the motor can generate in a linear region of operation. In some aspects, the operating range can change based on a temperature of the motor, as described above.

At operation 730, method 700 can include scaling, by the one or more processors, the specified intensity of the haptic effect (e.g., the requested set point current) based on the determined operating range of the motor, according to certain embodiments. By way of example, the input signal described above with respect to FIGS. 4 and 5 scale a 640 mA+/−80 mA input to a 533 mA+/−66.6 mA signal based on the modified current set point of the motor. In some aspects, "scaling" may refer to calculating a resultant value for a haptic effect as applied to a new set point, as described above with respect to FIG. 6. Alternatively, the "scaling" may be referring to both the calculating the resultant value and controlling the motor accordingly, as described below with respect to operation 740. Note that this application frequently refers to scaling a single set point, however it should be noted that in operation a stream of set points (e.g., requested set points from a software application for a particular haptic effect) would be typically scaled at a fast rate (e.g., 400+ set point adjustments per second, or the like).

At operation 740, method 700 can include controlling, by the one or more processors, the operation of the motor to generate the haptic effect at the scaled specified intensity (e.g., the scaled set point current), according to certain embodiments.

It should be appreciated that the specific steps illustrated in FIG. 7 provide a particular method 700 for modifying an operational set point of one or more motors of a peripheral device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 8:
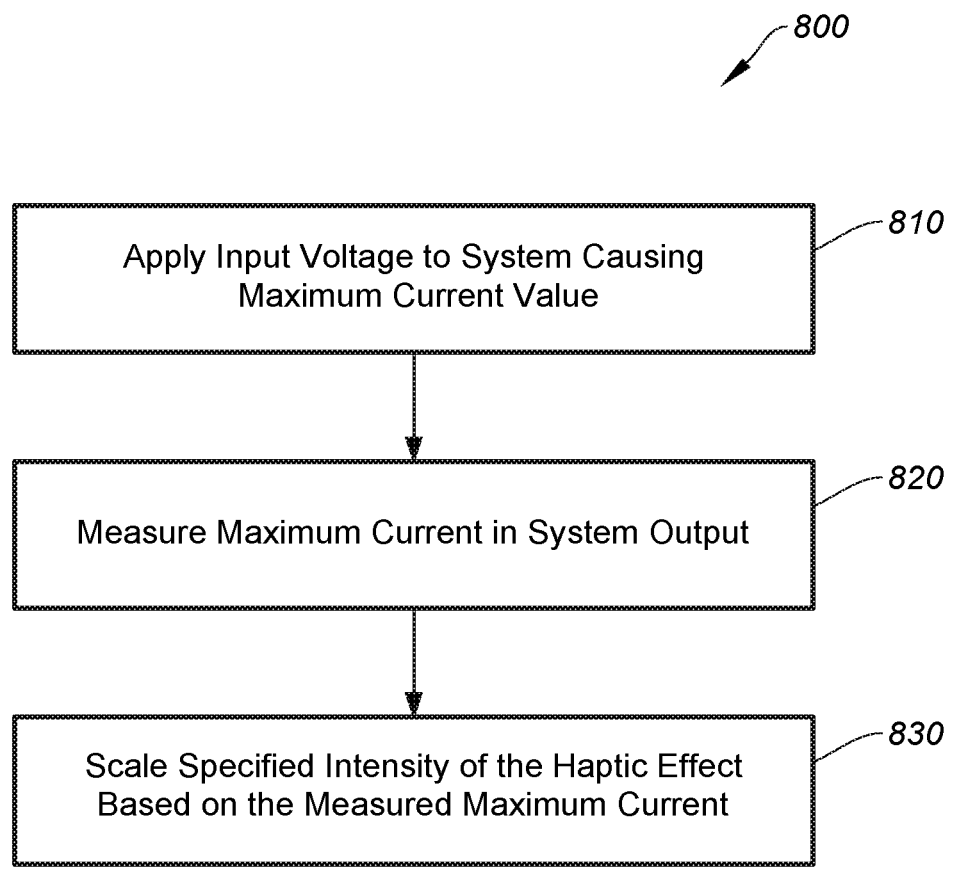
FIG. 8 is a simplified flow chart showing aspects of a method of controlling the operation of one or more motors configured for implementing a haptic effect in a peripheral device, according to certain embodiments.

FIG. 8 is a simplified flow chart showing aspects of a method 800 of modifying an operational set point for a motor of a peripheral device, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by aspects of system 200 (e.g., processor 210), system 300, system 900 (e.g., processor(s) 902), or a combination thereof.

At operation 810, method 800 can include applying an input voltage to the motor (e.g., via a closed-loop controller 310) that causes the motor to reach a maximum current value, according to certain embodiments. For instance, referring to the motor modeled in FIGS. 4-6, the input voltage may be a pulse-width-modulated (PWM) input cycle having a duty cycle that causes the motor to operate at 800 mA at 20° C., or at a lower current when the motor is at a higher temperature.

At operation 820, method 800 can include measuring the maximum current that the system (e.g., closed-loop controller and motor) can output. Thus, the measured maximum current value under nominal temperature conditions should be approximately equal to the maximum current value. That is, the motor may be designed to generate a maximum output torque (and corresponding haptic effect) with an 800 mA (e.g., at peak amplitude) input current when the motor is cool, such that an 800 mA signal should cause the motor to produce a corresponding linear output response up to an 800 mA driving current. When the motor heats up and the windings increase in electrical resistance, the system begins to saturate at lower input currents per Ohm's law. Referring to FIG. 5, the measured input current with an input signal intended to drive the motor to its maximum output capability (e.g., 800 mA) begins clipping (saturating) at approximately 533 mA, as described above. In that case, the new set point can be set to 533 mA and corresponding output of the motor can be scaled (e.g., compressed) accordingly.

Alternatively or additionally, measuring the input current may be when no back electro-motive force (EMF) is present on the motor. This may be when one no input is detected (e.g., the user is not turning the gaming wheel, moving the joystick, etc.), for instance. In some cases, the input current may be measured after the input current has stabilized (e.g., electronic noise settles, etc.), which may be based on any suitable predetermined wait time (e.g., after 10 ms, 100 ms, 1 s, 5 s, etc.), as would be appreciated by one of ordinary skill in the art with the benefit of this disclosure.

At operation 830, method 800 can include scaling the specified intensity of the haptic effect based on the measured maximum current of the motor, according to certain embodiments. In the example above, an application that is requesting a maximum output of the motor (e.g., 800 mA peak current) may cause the motor to output according to the scaled output (e.g., 533 mA peak current), as shown in FIG. 6.

It should be appreciated that the specific steps illustrated in FIG. 8 provide a particular method 800 for modifying an operational set point for a motor of a peripheral device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 9:
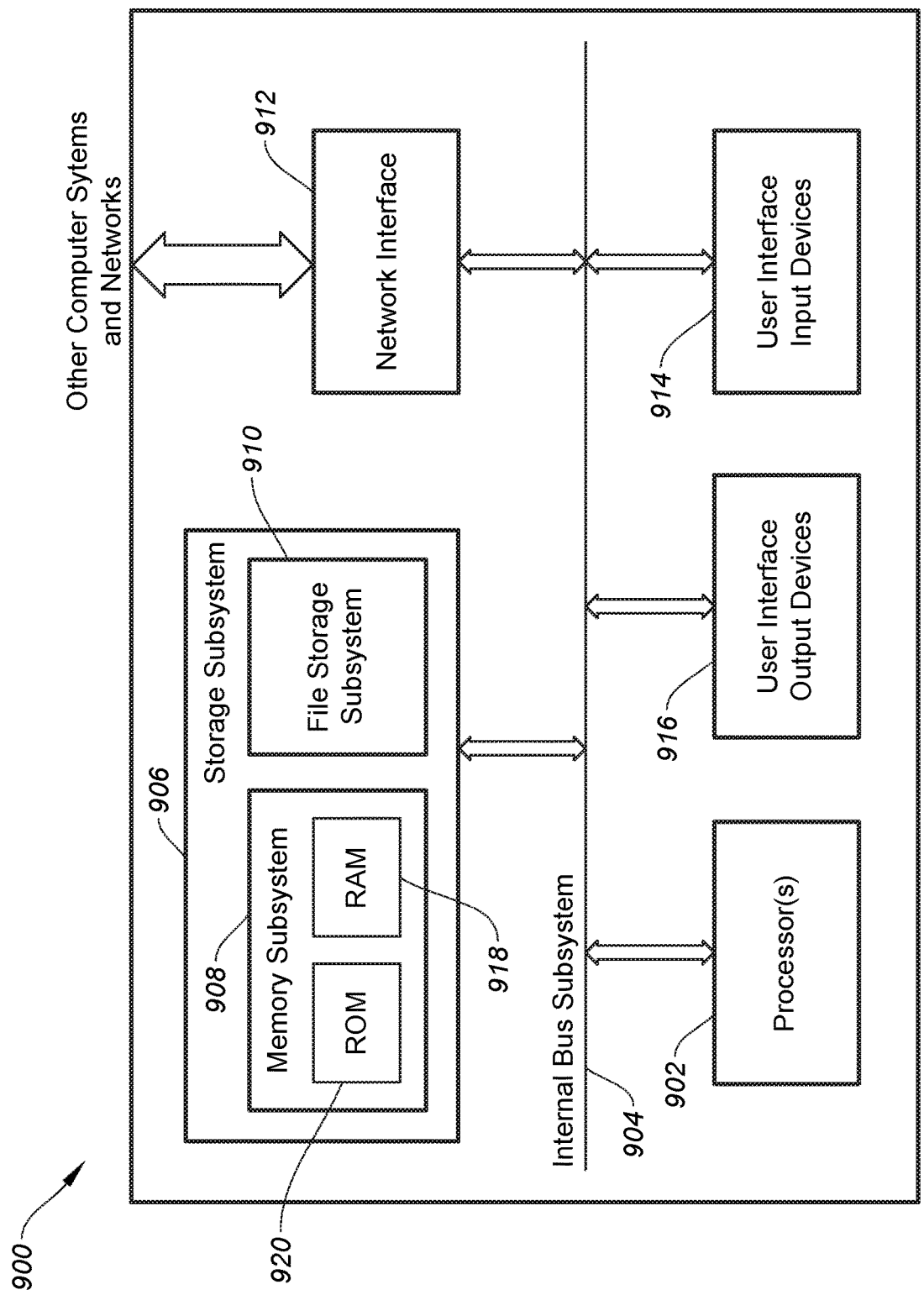
FIG. 9 shows a system diagram for implementing the various computing devices described herein, according to certain embodiments.

FIG. 9 shows a system 900 for implementing certain features of peripheral input devices disclosed herein according to certain embodiments. System 900 can be used to implement any of the host computing devices discussed herein and the myriad embodiments described herein or within the purview of this disclosure but not necessarily explicitly described. System 900 can include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and network interface subsystem 912. User interface input devices 914 can be any of the input device types described herein (e.g., keyboard, computer mouse, remote control, force-feedback and/or haptic systems, etc.). User interface output devices 916 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 904 can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computer system 900 and other computer systems or networks. Embodiments of network interface subsystem 912 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 914 can include a gaming wheel, a joystick, a computer mouse, a presenter, a pointing device (e.g., mouse, trackball, touchpad, etc.), a touch-screen incorporated into a display, audio input devices (e.g., voice recognition systems, microphones, etc.), Human Machine Interfaces (HMI), active pedal devices, or other type of input devices. In general, use of the term "input device" is intended to include all possible types of devices and mechanisms for inputting information into computer system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file storage subsystem 910. Memory subsystems 908 and file storage subsystem 910 represent non-transitory computer-readable storage media that can store program code and/or data that provide the functionality of embodiments of the present disclosure. In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above.

For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system comprising:
a host device configured to request a haptic effect from a peripheral device; and
the peripheral device including one or more processors configured to perform operations including:
receiving a request from the host device, by one or more processors, to generate a haptic effect at a specified intensity;
determining, by the one or more processors, a linear operating range of a motor configured to generate the haptic effect on the peripheral device,
wherein the operating range defines a maximum force that the motor can generate in a linear region of operation, and
wherein the operating range changes based on a temperature of the motor;
proportionally scaling, by the one or more processors, the specified intensity of the haptic effect based on the determined linear operating range of the motor; and
controlling, by the one or more processors, the operation of the motor to generate the haptic effect at the scaled specified intensity,
wherein the scaling is performed by the peripheral device.

2. The system of claim 1 wherein determining the linear operating range of the motor further comprises:
identifying a condition wherein a maximum input voltage is applied to the motor that causes an input current to the motor to reach a maximum current value for the motor's present temperature;
measuring the input current; and
using the measured input current as a maximum current that the scaled current applied to the motor to generate the requested haptic effect falls within.

3. The system of claim 2 wherein the motor operates in a closed-loop configuration to generate the haptic effect.

4. The system of claim 2 wherein the input current is measured when the motor is detected to be stationary.

5. The system of claim 2 wherein the input current is measured after the input current has stabilized.

6. A peripheral device comprising:
a housing;
one or more processors; and
a motor coupled to the housing and controlled by the one or more processors, the motor configured to generate a haptic effect based on an amount of electrical current driving the motor,
wherein the one or more processors are configured to:
receive a request to cause the motor to generate the haptic effect having a force;
determine a linear operating range of the motor, wherein the operating range is defined by a maximum force that the motor can generate, and wherein the maximum force that the motor can generate changes based on a temperature of the motor;
proportionally scale a current applied to the motor to generate the requested haptic effect based on the determined linear operating range of the motor; and
apply the scaled current to operate the motor to generate the haptic effect.

7. The peripheral device of claim 6 wherein determining the linear operating range of the motor further comprises:
identifying a condition wherein a maximum input voltage is applied to the motor that causes an input current to the motor to reach a maximum current value for the motor's present temperature;
measuring the input current; and
using the measured input current as a maximum current that the scaled current applied to the motor to generate the requested haptic effect falls within.

8. The peripheral device of claim 7 wherein the input voltage is a pulse-width-modulated (PWM) input signal having a duty cycle.

9. The peripheral device of claim 7 wherein the peripheral device is a gaming wheel, and wherein the peripheral device is further configured to detect that a manipulable wheel of the gaming wheel is stationary for a threshold time and no back electro-motive-force (EMF) is present in the motor.

10. The peripheral device of claim 7 wherein the input current is measured after the input current has stabilized.

11. The peripheral device of claim 7 wherein the motor operates in a closed-loop configuration to generate the haptic effect.

12. The peripheral device of claim 6 wherein the operating range of the motor further defines a maximum linear response curve used for generating the haptic effect in response to the request.

13. The peripheral device of claim 6 wherein the one or more processors are disposed in the housing of the peripheral device.

14. The peripheral device of claim 6 wherein the request is received from an external computing device communicatively coupled to the peripheral device, and the scaling is performed independently of the external computer device.

15. The peripheral device of claim 6 wherein the peripheral device is one of a computer mouse, a steering wheel, a gaming chair, gaming pedals, a presenter device, a game controller, a joystick, a smart wearable, a smart phone, a tablet computer, or haptic-enabled clothing.

16. A method of operating a peripheral device, the method comprising:
receiving a request, by one or more processors, to generate a haptic effect at a specified intensity;
determining, by the one or more processors, a linear operating range of a motor configured to generate the haptic effect on the peripheral device,
wherein the operating range defines a maximum force that the motor can generate in a linear region of operation, and
wherein the operating range changes based on a temperature of the motor;
proportionally scaling, by the one or more processors, the specified intensity of the haptic effect based on the determined linear operating range of the motor; and
controlling, by the one or more processors, the operation of the motor to generate the haptic effect at the scaled specified intensity.

17. The method of claim 16 wherein determining the linear operating range of the motor further comprises:
applying an input voltage to the motor that causes an input current to the motor to reach a predetermined maximum current value; and
measuring the input current,
wherein scaling the specified intensity of the requested haptic effect includes reducing the specified force based on the measured input current.

18. The method of claim 17 wherein the input voltage is a pulse-width-modulated (PWM) input signal having a duty cycle.

19. The method of claim 17 wherein the input current is measured when no back electro-motive-force (EMF) is present on the motor.

20. The method of claim 17 wherein the input current is measured after the input current has stabilized.

* * * * *